(12) United States Patent
Beetz et al.

(10) Patent No.: US 11,981,083 B2
(45) Date of Patent: May 14, 2024

(54) PRODUCTION LINE AND 3D-PRINTING DEVICE

(71) Applicants: Brose Fahrzeugteile SE & Co. Kommanditgesellschaft, Würzburg, Würzburg (DE); AIM3D GmbH, Rostock (DE)

(72) Inventors: Stefan Beetz, Barnin (DE); Clemens Lieberwirth, Rostock (DE); Vincent Morrison, Krakow am See (DE)

(73) Assignees: Brose Fahrzeugteile SE & Co. Kommanditgesellschaft, Würzburg (DE); AIM3D GmbH (DE)

( * ) Notice: Subject to any disclaimer, the term of this patent is extended or adjusted under 35 U.S.C. 154(b) by 191 days.

(21) Appl. No.: 17/617,753

(22) PCT Filed: Jun. 10, 2020

(86) PCT No.: PCT/EP2020/066084
§ 371 (c)(1),
(2) Date: Dec. 9, 2021

(87) PCT Pub. No.: WO2020/249613
PCT Pub. Date: Dec. 17, 2020

(65) Prior Publication Data
US 2022/0242045 A1    Aug. 4, 2022

(30) Foreign Application Priority Data

Jun. 11, 2019   (DE) .................... 10 2019 208 440.0

(51) Int. Cl.
*B29C 64/379* (2017.01)
*B22F 12/80* (2021.01)
*B29C 64/153* (2017.01)
*B29C 64/321* (2017.01)
*B33Y 30/00* (2015.01)
(Continued)

(52) U.S. Cl.
CPC ............ *B29C 64/379* (2017.08); *B22F 12/80* (2021.01); *B29C 64/153* (2017.08); *B29C 64/321* (2017.08); *B33Y 30/00* (2014.12); *B33Y 40/20* (2020.01); *B29C 2071/0027* (2013.01)

(58) Field of Classification Search
CPC .......... B33Y 30/00; B33Y 40/00; B33Y 40/20
See application file for complete search history.

(56) References Cited

U.S. PATENT DOCUMENTS

| 2016/0311166 A1 | 10/2016 | Campbell |
| 2017/0050379 A1 | 2/2017 | Houben et al. |

(Continued)

FOREIGN PATENT DOCUMENTS

| CN | 206781019 U | 12/2017 |
| DE | 10347956 A1 | 10/2004 |

(Continued)

*Primary Examiner* — Mary Lynn F Theisen
(74) *Attorney, Agent, or Firm* — Dickinson Wright PLLC

(57) ABSTRACT

A 3D printing device for building up a three-dimensional workpiece layer-by-layer includes a first side having a removal area in which a workpiece is built up by the printing device, wherein the removal area provides manual removability of the workpiece therefrom; a second side having a workpiece output from which the workpiece is removable; and a conveying device configured to remove the workpiece from the removal area in an automated way.

17 Claims, 3 Drawing Sheets

(51) Int. Cl.
B33Y 40/20     (2020.01)
*B29C 71/00*     (2006.01)

(56) References Cited

U.S. PATENT DOCUMENTS

| | | | |
|---|---|---|---|
| 2017/0297108 A1 | 10/2017 | Gibson et al. | |
| 2017/0341303 A1 | 11/2017 | Höchsmann et al. | |
| 2019/0299521 A1* | 10/2019 | Kremer | B22F 10/28 |
| 2019/0299532 A1* | 10/2019 | Kremer | B33Y 40/20 |
| 2021/0187854 A1* | 6/2021 | Peng | B33Y 40/00 |
| 2021/0197477 A1* | 7/2021 | Pourcher | B29C 64/35 |

FOREIGN PATENT DOCUMENTS

| | | |
|---|---|---|
| DE | 102014016718 A1 | 5/2016 |
| DE | 102017219090 A1 | 4/2019 |
| WO | 2015121140 A1 | 8/2015 |
| WO | 2015163765 A1 | 10/2015 |
| WO | 2018039261 A1 | 3/2018 |

* cited by examiner

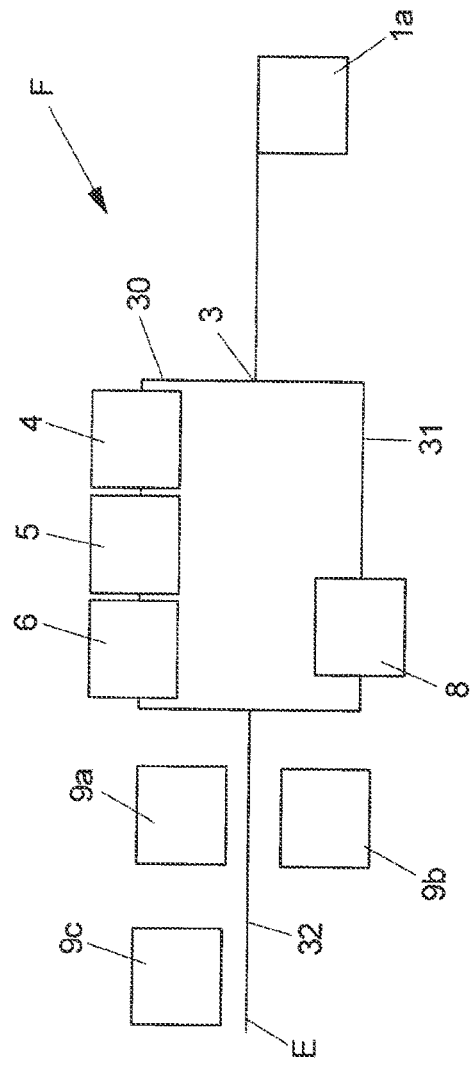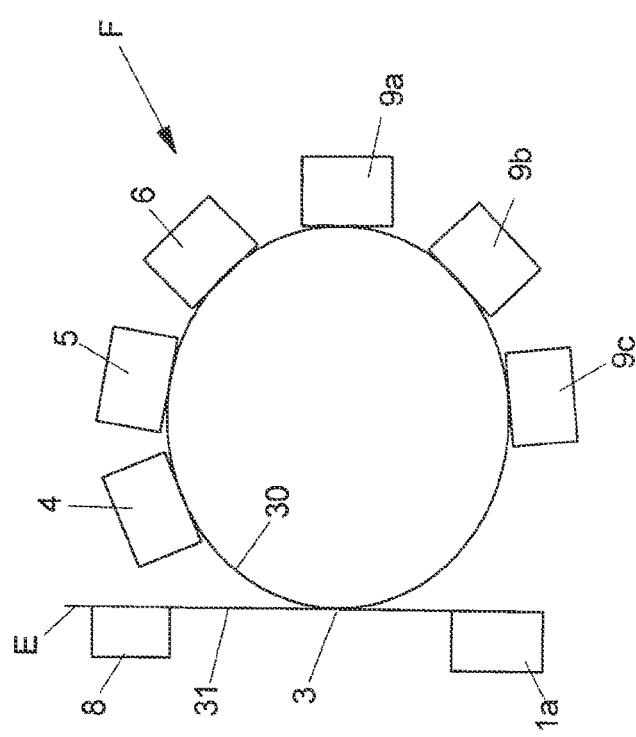

PRODUCTION LINE AND 3D-PRINTING DEVICE

CROSS-REFERENCE TO RELATED APPLICATIONS

This application is the U.S. National Phase of PCT Application No. PCT/EP2020/066084 filed on Jun. 10, 2020, which claims priority to German Patent Application No. DE 10 2019 208 440.0, filed on Jun. 11, 2019, the disclosures of which are hereby incorporated in their entirety by reference herein.

TECHNICAL FIELD

The proposed solution relates to a production line with at least one 3D printing device and to a 3D printing device.

BACKGROUND

In 3D printing, three-dimensional workpieces usually are built up layer-by-layer from one or more materials. Example materials include plastics, resins, ceramics and/or metals. For example, the method of so-called fused filament fabrication (FFF) or fused deposition modeling (FDM) is known in this connection. In this method, a workpiece is built up layer-by-layer from a meltable plastic and/or with a metal and/or ceramic powder.

SUMMARY

The proposed production line and 3D printing device provides at least partial automation in the production of three-dimensionally printed workpieces.

A production line with at least one 3D printing device builds up a three-dimensional workpiece layer-by-layer and with at least two different processing stations for the further processing of the workpiece built by the at least one 3D printing device. The production line may include two production sections interconnected via a bifurcation, to which a workpiece built up by the at least one 3D printing device can selectively be supplied to the production line via a conveying device in an automated way. A first production section here includes at least one first processing station, while a second production section includes at least one second processing station.

The proposed production line thus provides that a three-dimensional workpiece printed by the 3D printing device can selectively be supplied to at least two different subsequent processes in an automated way. For example in dependence on a stored manufacturing scenario selected on the part of a user and in dependence on a related computer program sequence, a first type of a workpiece manufactured by the 3D printing device can then be supplied to the first production section. For a subsequently printed workpiece of a second type, it can in turn be provided that at the bifurcation this workpiece is supplied to the other, second production section. In this way, different types of workpieces can be three-dimensionally printed by a 3D printing device in an automated way and hence also in higher quantities and can be supplied to succeeding manufacturing processes.

In this connection it can be provided, for example, that via the bifurcation and an electronic control system of the production line a workpiece built up the at least one 3D printing device can be supplied either to the first production section or to the second production section for further processing in an electronically controlled way. Hence, the conveying device, which for example comprises a conveyor belt, a pallet system and/or an industrial robot, is controlled via the electronic control system in such a way that at the bifurcation—in dependence on the printed workpiece—the workpiece is automatically supplied to the one or other production section for further processing and passes through at least one processing station provided here.

In one design variant, at least one processing station of the two production sections, i.e., at least one first and/or one second processing station of the two production sections, is adapted and provided for sintering a workpiece built up the at least one 3D printing device. For example, a production section in this connection includes a debinding station, a sintering station and a cooling section for the further processing of a three-dimensionally printed workpiece.

To facilitate the automated production of a component to be sintered, the production line for example can comprise a changing device that is adapted to place a workpiece built up by the at least one 3D printing device on a sintering carriage, by which the workpiece is handled for further processing. This includes the fact that the sintering carriage together with the three-dimensionally printed workpiece disposed thereon can be supplied to a processing station adapted and provided for sintering. Due to being placed on a sintering carriage, the printed workpiece within the production line can more easily be supplied to the sintering process downstream of the actual 3D printing process in an automated way and via a motorized conveying device.

For the further automation and handling, it is provided for example in a development that the workpiece is printed on a sintering base plate in the 3D printing device, and this sintering base plate subsequently is automatically placed on a sintering carriage together with the workpiece disposed thereon. A corresponding (printing) platform on the 3D printing device then can subsequently be equipped with a new sintering base plate in an automated way so that further workpieces can be printed continuously and can be moved on in an automated way.

The changing device can be adapted to convey a printing platform of the at least one 3D printing device, on which the workpiece is built up, back to the at least one 3D printing device. By this changing device, for example, a printing platform with a printing plate and a sintering base plate can be conveyed back to be used again on the 3D printing device, after the three-dimensionally printed workpiece disposed thereon previously has been removed therefrom.

In this connection it can also be provided for example that the production line includes a cleaning station for cleaning a printing platform or at least a base plate, e.g., a sintering base plate for the printing platform. When the printed workpiece is removed from the printing platform and possibly from a sintering base plate of this printing platform, the printing platform is automatically supplied to the cleaning station and from the same conveyed back to the 3D printing device. For this purpose, the changing device for example can comprise one or more conveyor belts and/or at least one industrial robot.

In one design variant, the first production section and the second production section open into a common removal area at which a finished workpiece, i.e., a workpiece which has passed through the respective manufacturing process(es) implemented via the first or second production section and following the 3D printing process, can be removed. Since the first and second production sections open into a common removal area, finished workpieces can be removed at one and the same removal area of the production line, regardless of whether the respective workpiece has been further processed via the first production section or the second production section. In this way, the removal of the finished workpieces can be simplified and the production line can be of comparatively compact design.

In one design variant, the at least one 3D printing device used in the production line can be adapted on the software side in order to print different workpieces. Thus, a three-dimensionally printed workpiece not only can be further processed differently via the different production sections. Rather, in this design variant another variability is achieved already via the 3D printing device, as in the 3D printing device merely a new configuration needs be stored in order to print a different workpiece. Via the electronic control system and the conveying device of the production line, the supply to the different production sections (and hence e.g., different post-processing steps) then can be set in dependence on the workpiece.

For the further flexibilization and increase in productivity, the at least one 3D printing device in one design variant is configured with a workpiece removal area on a first side and with a workpiece output on a second side. At the workpiece removal area a workpiece built up by the at least one 3D printing device can be removed, while at the workpiece output on another side of the 3D printing device a workpiece built up by the at least one 3D printing device can be supplied to the bifurcation via the conveying device of the production line. Thus, a corresponding 3D printing device has accesses provided on different sides for various purposes. For example, a first access provided via the workpiece removal area can be provided on a front side of the 3D printing device, and a second access provided via the workpiece output can be provided on a back or long side of the 3D printing device.

For example, the workpiece removal area of the first side provides for a manual removal of a workpiece and a manual setup of the 3D printing device. While 3D printing devices previously known in the market merely provide a single access to a printing space of the 3D printing device and hence, for example, to a printing platform on which the workpiece is to be printed, the design variant proposed here provides that the printing space is accessible from at least two different sides. Thus, via the workpiece removal area, as hitherto customary, a manual removal of a workpiece and the setup of the 3D printing device via an operator still is possible. Via the additionally provided workpiece output, at least one second access to the printing space, e.g., on the back side or laterally, furthermore is available, which is provided for an automated conveyance of a three-dimensionally printed workpiece for further processing in the production line. In principle, there can also be provided more than two areas for the workpiece removal or output. For example, a removal of a workpiece from four different sides and/or a removal from above can be made possible.

In one design variant, at least two 3D printing devices are provided, wherein via the conveying device of the production line a workpiece built up by the respective 3D printing device then can each be supplied to the bifurcation and selectively to the first or second production section. Thus, in at least two 3D printing devices possibly identically constructed, but also different workpieces and workpieces built up with different printing materials can be printed in parallel, which then can be supplied to the different production sections for further processing in an automated way.

In a design variant with at least two 3D printing devices it can also be provided that the 3D printing devices each include a workpiece removal area and a workpiece output so that on each 3D printing device at least two different accesses to a printing space of the respective 3D printing device ultimately are present. In this connection, it can be provided that the at least two 3D printing devices are adapted to manually set up and/or try out the manufacture of a workpiece via the workpiece removal area of a first side of one of the at least two 3D printing devices, while from the workpiece output of a second side of another of the at least two 3D printing devices a workpiece is supplied to the bifurcation and selectively to the first or second production section via the conveying device, in an automated way. Thus, the (further) manufacture is possible on one or more of the 3D printing devices in an automated way, while on at least one of the 3D printing devices a retrofit and/or trial is effected via the workpiece removal area.

In a corresponding production line including 3D printing devices with two accesses for a manual and automated workpiece removal, an electronic control system is provided, for example, which on the part of the user provides for setting the kind of utilization of one or more of the 3D printing devices of the production line. For example, in this way it can be set electronically that merely one of the 3D printing devices is operated manually, for example for prototype production, while one or more other 3D printing devices of the same production line (still) manufacture workpieces in a computer-aided way, which via the respective other access can automatically be removed and be moved on by the conveying device on a possibly present changing device.

In one design variant a material supply is provided, via which at least two 3D printing devices of the production line are supplied with printing material in an automated way. Thus, in such a design variant it is not absolutely necessary that printing material reservoirs or hoppers present on a 3D printing device are refilled by an operator. Rather, a plurality of 3D printing devices here are supplied with the provided printing material from a central material supply in an automated way, for example, by filling level signals of corresponding filling level sensors. It can also be provided here that the 3D printing devices can be supplied with different printing materials via the central material supply.

Another aspect of the proposed solution relates to a 3D printing device for building up a three-dimensional workpiece layer-by-layer. It is proposed here that not only on a first side, e.g., on a front side, the 3D printing device includes a workpiece removal area on which a workpiece built up by the 3D printing device can be manually removed. Rather, a proposed 3D printing device has a workpiece output on a second side of the 3D printing device, for example, on back or long side, from which workpiece output a workpiece built up by the 3D printing device can be removed in an automated way via a conveying device.

Thus, a proposed 3D printing device provides at least two different accesses to a printing space of the 3D printing device on two sides, wherein at least one access is adapted and provided for an automated workpiece removal, for example by a gripper reporter and/or a conveyor belt. A furthermore present workpiece removal area for a manual workpiece removal ensures that the 3D printing device, e.g., in the form of a 3D printer, can also be operated independently of a conveying device for the automated removal of a workpiece. Thus, the 3D printing device is flexibly usable and can be employed in a design variant of a proposed production line.

BRIEF DESCRIPTION OF THE DRAWINGS

FIG. 3 shows a top view of another design variant of a proposed production line; and FIG. 4 shows a top view of another design variant of a proposed production line.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

For the production of the respective workpiece layer-by-layer, printing material is applied on a printing plate via at least one printing nozzle of a 3D printing device, e.g., in the form of a so-called 3D printer. The printing material exiting at the printing nozzle is used to build up the respective workpiece layer-by-layer in a computer-aided way.

Previously known 3D printing devices usually are adapted and provided for the manual removal of a three-dimensional workpiece built up layer-by-layer. Typically, a printing plate with the workpiece printed thereon is removed by an operator from an interior space of the 3D printing device, possibly by utilizing lifting tools. The workpiece frequently is supplied to a subsequent process, for example, to a sintering process. For this purpose, the operator supplies the printed workpiece to a corresponding further processing station, for example to a sintering furnace.

Thus, the manufacturing processes including a 3D printing device, which have been commonly used so far in practice, regularly frequently require manual interventions by an operator and are suitable for an industrial production only with some cutbacks.

Figure 1:
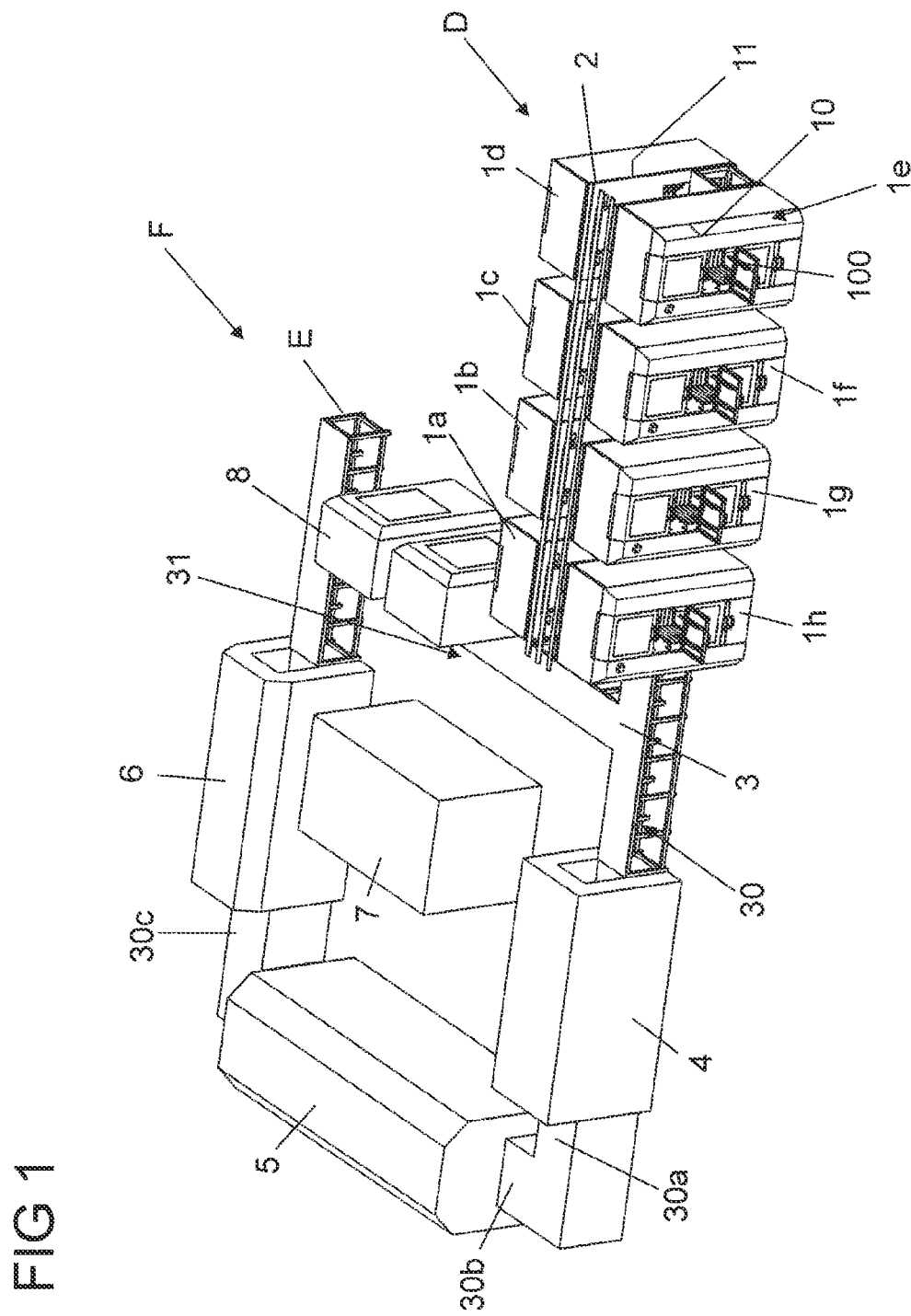
FIG. 1 shows a perspective view of a design variant of a proposed production line with a plurality of 3D printing devices for three-dimensionally printing workpieces, which can be further processed on the production line in an automated way via two different production sections of the production line.
Figure 2:
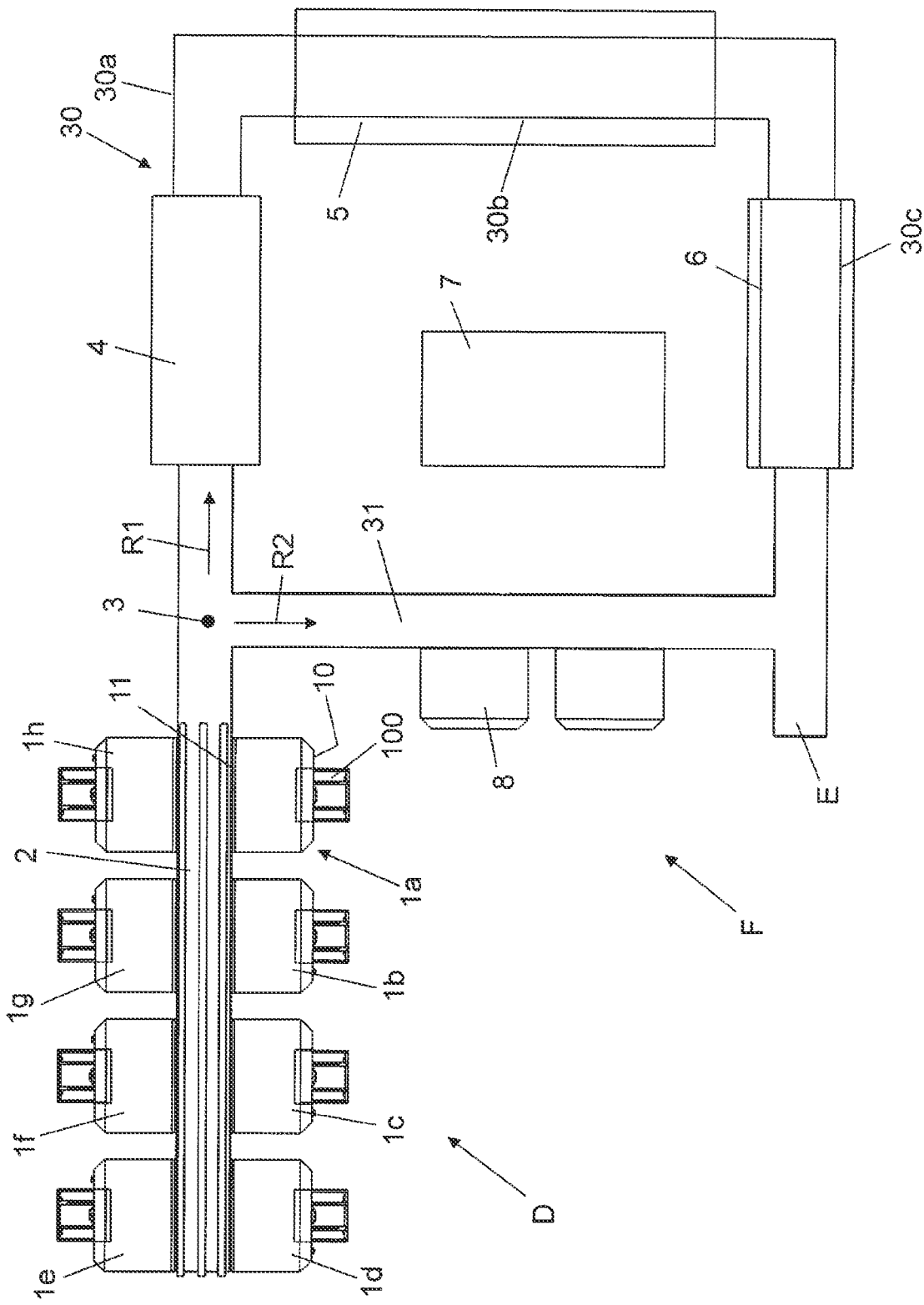
FIG. 2 shows the production line of FIG. 1 in a top view.

FIGS. 1 and 2 show different views of a production line F, which among other things, includes a printer arrangement D including a plurality of 3D printing devices in the form of 3D printers $1a$ to $1h$. The 3D printers $1a$ to $1h$ are arranged in series in one row opposite each other in pairs so that between them a conveying line of a conveying device of the production line F extends, via which workpieces printed by the 3D printers $1a$ to $1h$ can be carried away in an automated way and be supplied to further processing. The 3D printers $1a$ to $1h$ are supplied with printing material via a central material supply 2. The material supply 2 therefor includes a plurality of supply lines to the 3D printers $1a$ to $1h$.

Each 3D printer $1a$ to $1h$ of the printer arrangement D of the production line F is adapted and provided for building up a three-dimensional workpiece layer-by-layer, for example by way of fused deposition modeling. Each of the 3D printers $1a$-$1h$ in may have two accesses to a printing space in the interior of the respective 3D printer $1a$ to $1h$. A first front-side access is provided on a front side 10 with a workpiece removal area. A second access is provided at the rear, i.e., on a back side 11 facing an opposite 3D printer. The back sides 11 are facing the conveying line of the conveying device of the production line F so that via the back sides 11 of the 3D printers $1a$ to $1h$ three-dimensionally printed workpieces can be carried away in an automated way.

Via the front sides 10 of the individual 3D printers $1a$ to $1h$, each of the 3D printers $1a$ to $1h$ still remains accessible for an operator, for example in order to perform a retrofit and/or trial on a printing plate 100 of a platform unit of the respective 3D printer $1a$ to $1h$, without having to therefor interrupt a production of workpieces via the other 3D printers.

The production line F includes two production sections 30 and 31 which are connected to each other at a bifurcation 3 so that workpieces coming from the printer arrangement D can selectively be supplied either to the one production section 30 along a conveying direction R1 or to the other production section 31 along another conveying direction R2. The production line F and a conveying device also integrated in the production sections 30 and 31, for example, with at least one conveyor belt and/or industrial robot, can be controlled in an automated way via an electronic control system so that in dependence on the workpiece produced in the printer arrangement D the workpiece is automatically supplied to the appropriate production section 30 or 31 for further processing.

The one (first) production section 30 is equipped with three processing stations 4, 5 and 6 via a plurality of interconnected sub-sections 30$a$, 30$b$ and 30$c$. A first processing station here is formed by a debinding station 4, a second processing station is formed by a sintering station 5, and a third processing station is formed by a cooling section 6 in this example. Thus, a three-dimensionally printed workpiece coming from the printer arrangement D can be automatically supplied to a sintering process via the one production section 30, at the end of which the finished workpiece can be removed from the production line F at a removal area E.

Those workpieces which have been processed further via the other (second) production section 31 will also reach the removal area E. The production section 31 here is distinctly shorter than the production section 30 including the sintering station 5. In the illustrated exemplary embodiment, the other (second) production section 31 by way of example merely includes a post-processing station 8, for example, for drying a workpiece. Alternatively or additionally, the post-processing station can be provided for example for cleaning parts utilized for transport and/or parts utilized during manufacturing processes carried out previously, for mechanical rework on the green body or plastic component (e.g., by a robot), for removing support material, for surface blasting and/or surface sealing.

With regard to the sintering station 5 present on the first production section 30, it can be provided, for example, that via a changing device a workpiece removed from a 3D printer $1a$ to $1h$ at its back side 11 is placed on a sintering carriage—possibly together with a removed sintering base plate. Subsequently, the workpiece on this sintering carriage passes through the individual processing stations 4, 5 and 6 of the first production section 30.

In this connection it can also be provided that after the removal of the workpiece at the removal area E, a sintering base plate is supplied to a cleaning station and then is again automatically inserted on a 3D printer $1a$ to $1h$, on its respective printing plate 100, by the changing device. Correspondingly, it can be provided, for example, that a three-dimensionally printed workpiece is automatically removed on a back side 11 and supplied to the respective production section 30 or 31 via the bifurcation 3. Subsequently, a new sintering base plate is directly transported to the respective 3D printer 1a to 1h via the changing device so that thereupon a new workpiece can immediately be printed again. This allows a continuous and also industrial production of complex, additively manufactured workpieces.

In the design variant of FIGS. 1 and 2, the production line F additionally provides a processing station in the form of a furnace 7. This furnace 7 is enclosed by the sub-sections 30a, 30b and 30c of the first production section 30 and the other production section 31 and thus is located in an inner area of the production line F. This furnace 7 thus can be utilized by an operator in combination with all production sections 30 and 31 in order to for example supply a workpiece to the furnace 7 also manually, if necessary. Of course, it is conceivable especially with regard to an automated production that in the enclosed area with the furnace 7 a gripping robot is provided, by which a workpiece can be supplied to the furnace 7, if necessary, and subsequently is again supplied to one of the production sections 30, 31 or transported directly to the removal area E.

FIGS. 3 and 4 show two further design variants of a proposed production line F, each in a top view. In the examples of FIGS. 3 and 4, merely one 3D printer 1a is provided at the beginning of the respective production line F. Analogous to the design variant of FIGS. 1 and 2, however, additional printers may be used.

In FIG. 3, the two production sections 30 and 31 with the different processing stations 4 to 6 and 8, which are connected to each other via a bifurcation 3, are adjoined by a common production line portion 32 with one or (as shown) several post-processing stations 9a to 9c. Regardless of whether a workpiece coming from a 3D printer 1a has been further processed via the one production section 30 or the other production section 31, the processed workpiece here consequently then reaches the production line portion 32 including the removal area E. In this production line portion, the workpiece then can selectively be supplied to one or more of the post-processing stations 9a, 9b and/or 9c for a specified post-processing step.

In FIG. 4, first production section 30 is configured as a circular track or roundabout. Thus, after passing through the first production section 30, a workpiece again reaches a bifurcation and thereafter can be supplied to a second production section 31 with the post-processing station 8. Depending on the workpiece to be manufactured, the first production section 30 can be passed through, at which the workpiece is further processed at one or more of the processing stations 4 to 6 and 9a to 9c arranged thereon. Via the bifurcation 3, the workpiece subsequently reaches the second production section 31 at which the workpiece then can optionally be further processed at the post-processing station 8. Alternatively, a workpiece originating from the 3D printer 1a (or another 3D printer of a printing arrangement D) can be supplied past the first production section 30 merely to the second production section 31.

In the case of the circular track of FIG. 4, a processing sequence can also be electronically controlled and thus be automated to the effect that the workpiece is subjected to a manufacturing process along a conveying direction along the circular track only at one or only a part of the processing stations 4 to 6 and 9a to 9c and is then provided at the removal area E via the second production section 31. It can likewise be provided that a workpiece is guided at least two times along the conveying direction over the first production section 30 so that in a second pass at least one other processing station is used than in a first pass.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1a-1h 3D printer
100 printing plate
10 front side with workpiece removal area
11 back side with workpiece output
2 material supply
3 bifurcation
30 1st production section with conveyor belt
30a, 30b, 30c sub-section
31 2nd production section with conveyor belt
32 production line portion
4 debinding station
5 sintering station
6 cooling section
7 furnace
8 post-processing station
9a, 9b, 9c post-processing station
D printer arrangement
E removal area
F production line
R1, R2 direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A production line comprising:
   at least one 3D printing device for building up a three-dimensional workpiece layer-by-layer;
   at least first and second processing stations for further processing of the workpiece built up by the at least one 3D printing device; and
   two production sections interconnected via a bifurcation, to which selectively a workpiece built up by the at least one 3D printing device is supplied in an automated way via a conveying device of the production line and of which a first of the production sections includes the first processing station and a second of the production sections includes the second processing station,
   wherein the at least one 3D printing device includes a first side having a workpiece removal area where a workpiece that is built up by the at least one 3D printing device can be removed, and includes a second side having a workpiece output, wherein the workpiece is supplied to the bifurcation via the conveying device.

2. The production line according to claim 1, wherein, via the bifurcation and an electronic control system of the production line, a workpiece built up by the at least one 3D printing device is supplied either to the first production section or to the second production section in an electronically controlled way for further processing.

3. The production line according to claim 1, wherein the first processing station and/or the second processing station is adapted for sintering a workpiece built up by the at least one 3D printing device.

4. The production line according to claim 3, wherein the production line further includes a changing device that is adapted to place a workpiece built up by the at least one 3D printing device on a sintering carriage configured to sinter the workpiece.

5. The production line according to claim 4, wherein the changing device is further adapted to recirculate a printing platform of the at least one 3D printing device from an output side of the 3D printing device to an input side of the 3D printing device.

6. The production line according to claim 1, wherein the first production section and the second production section open into a common removal area at which a finished workpiece can be removed.

7. The production line according to claim 1, wherein the at least one 3D printing device is adaptable on a software side in order to print different workpieces.

8. The production line according to claim 1, wherein, via the workpiece removal area of the first side, a manual removal of a workpiece and a setup of the 3D printing device is made possible.

9. The production line according to claim 1 further comprising a material supply configured to supply printing material to the at least one 3D printing device in an automated way.

10. A 3D printing device for building up a three-dimensional workpiece layer-by-layer, the 3D printing device comprising:
a first side having a removal area in which a workpiece is built up by the printing device, wherein the removal area provides manual removability of the workpiece therefrom;
a second side having a workpiece output from which the workpiece is removable; and
a conveying device configured to remove the workpiece from the removal area in an automated way.

11. A production line comprising:
a 3D printing device configured to produce three-dimensional workpieces layer-by-layer;
a first processing station configured to perform a first type of secondary processing to a workpiece produced by the printing device;
a second processing station configured to perform a second type of secondary processing to a workpiece produced by the printing device;
a conveying system including a first section configured to receive the workpieces produced by the printing device, a second section associated with the first processing station, and a third section associated with the second processing station;
a bifurcation configured to selectively route each of the workpieces received from the first section to either the second section or the third section; and
a removal area configured to receive the workpieces from the first processing station and the second processing station,
wherein the 3D printing device includes a first side having a workpiece removal area where the workpieces are produced and a second side having a workpiece output, wherein the first section receives the workpieces from the second side.

12. The production line according to claim 11, wherein the conveying system includes at least one conveyor belt.

13. The production line according to claim 11, wherein the first section, the second section, and the third section, are joined at the bifurcation.

14. The production line according to claim 11, wherein the 3D printing device is a plurality of printing devices.

15. The production line according to claim 11, wherein the first processing station is a sintering device.

16. The production line according to claim 15 further comprising a changing device adapted to place one or more of the workpieces on a sintering carriage.

17. A production line comprising:
at least two 3D printing devices each configured for building up a three-dimensional workpiece layer-by-layer;
at least first and second processing stations for further processing of the workpiece built up by the at least two 3D printing devices; and
two production sections interconnected via a bifurcation, to which selectively a workpiece built up by the at least two 3D printing devices is supplied in an automated way via a conveying device of the production line and of which a first of the production sections includes the first processing station and a second of the production sections includes the second processing station,
wherein the conveying device is configured to carry workpieces built up by the at least two 3D printing devices to the bifurcation and selectively to the first or second production section, and
wherein the at least two 3D printing devices each include a workpiece removal area and a workpiece output and are adapted to manually set up manufacture of a workpiece via the workpiece removal area, while from the workpiece output of another of the at least two 3D printing devices a workpiece is supplied to the bifurcation and selectively to the first or second production section via the conveying device in an automated way.

* * * * *